March 19, 1935.    W. E. HORROCKS    1,994,996
THRUST BEARING
Filed Nov. 14, 1933

INVENTOR
WALTER E. HORROCKS
BY
ATTORNEY

Patented Mar. 19, 1935

1,994,996

UNITED STATES PATENT OFFICE 1,994,996

THRUST BEARING

Walter E. Horrocks, Lakewood, Ohio

Application November 14, 1933, Serial No. 697,950

1 Claim. (Cl. 308—231)

My invention relates to certain new and useful improvements in thrust bearings, the purposes and objects of which will be apparent from the following description:

The thrust bearings referred to are of the jacketed type wherein the jacket or casing is spun or curled around the edge of the race to hold the entire bearing together. Present thrust roller bearings are made by inserting the rollers in a cage which has an inner and outer ring for retaining the roller within the cage and the entire assembly of cage and rollers are inserted between the races which are held together with a jacket or casing.

Another type of thrust bearing is one in which the separator is made from thin metal consisting of an inner ring with projecting spokes, the outer ends of the spokes being supported upon the race flanges, said race flanges being turned towards the inner side of the bearing to form a thrust shoulder for the rollers, and the entire assembly of rollers, separator and races are held together with a spun casing or jacket.

With the two types described it is apparent that in a thrust bearing with a given inside and outside dimension the maximum length of the roller bearings is limited to the outside dimension less the inside dimension plus the width of the inner and outer ring of the cage, or the outside dimension less the inside dimension plus the width of the inner ring of the separator and the width of the roller thrust flange of the race.

In order to increase the bearing capacity of thrust bearings of this type without increasing the diameter of the roller bearings I have invented a bearing which will allow the length of the rollers being made considerably longer than is possible with present practice.

This is accomplished by using the separator such as shown in my application Serial No. 531,429, filed April 20, 1931, which allows the spokes of the separator to extend to the inside face of the jacket utilizing a pair of races with a straight or flat contact surface on the roller bearing side which allows the rollers to extend to the inside of the jacket and using the jacket to confine the rollers within the bearing between the spokes of the separators, the combination of which will allow the making of a roller bearing of a longer length, the increased length of the bearing occupying the space made available by eliminating the space required with the outer ring of a bearing cage or the thrust shoulder on the races.

This invention is illustrated in the accompanying drawing in which.

Figure 1:
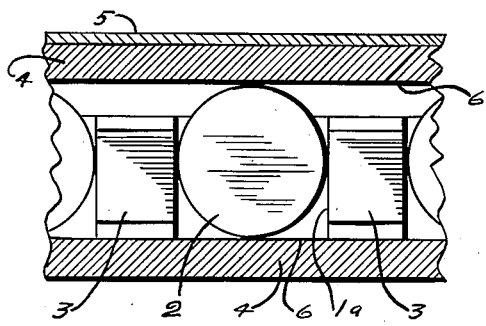
Fig. 1 is a fragmentary section showing the separator, rollers, races and casing or jacket.
Figure 2:
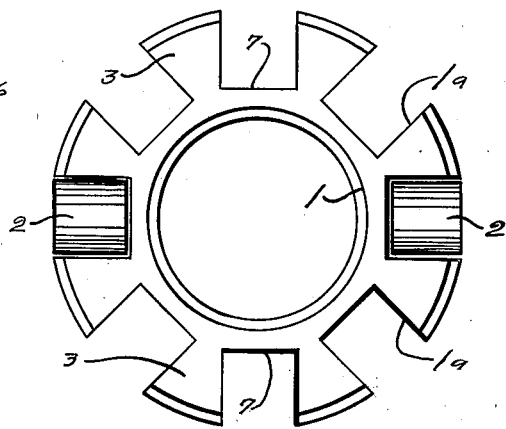
Fig. 2 is a plan of a separator with two rollers set in place between the spokes with the rollers extended to the outer edge of the separator.

Referring specifically to the drawing in which similar numerals of reference indicate similar parts, 1 is a roller bearing separator recessed or cut away in the shape of slots 1a at the outer edge to form spaces for the rollers 2 to rotate between the spokes 3 of the roller separator 1, which separator is substantially of the type shown in my said application, a characteristic feature of which is that the thickness of the separator is greater than one-half the distance between the races, so that the separator can never become "cocked" or overrun by the rollers.

The complete assembly of the rollers 2, roller separator 1 and roller retainers or races 4 are held together by a spun casing or jacket 5 which prevents the parts from becoming separated thus allowing the free rotation of the rollers 2 and the separator 1 between the roller retainers or races 4.

The inside face 6 of the races or retainers 4 allows roller bearings 2 to extend between the face 7 of the separator 1 and the inner face 8 of the jacket or casing 5, the inner face 6 of the races or retainers 4 being made flat allow the roller bearings 2 to extend to the outer edge of the races or retainers 4 which feature permits making the length of the rollers 2 longer than it is possible to do with bearings contained in a cage, or a separator combined with races having a roller thrust shoulder on its outer edge.

This device can be used in all types of straight or taper roller bearings which are used as thrust bearings and will allow the rollers to be increased in length thereby increasing the load bearing capacity of the entire bearing.

Figure 3:
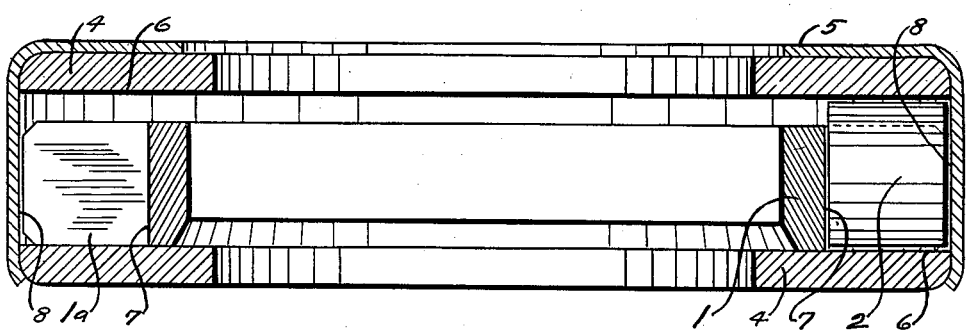
Fig. 3 is a cross sectional view through the center of the roller bearing showing one spoke of the roller bearing separator without the roller in place, and one spoke with the roller in place.
Figure 4:
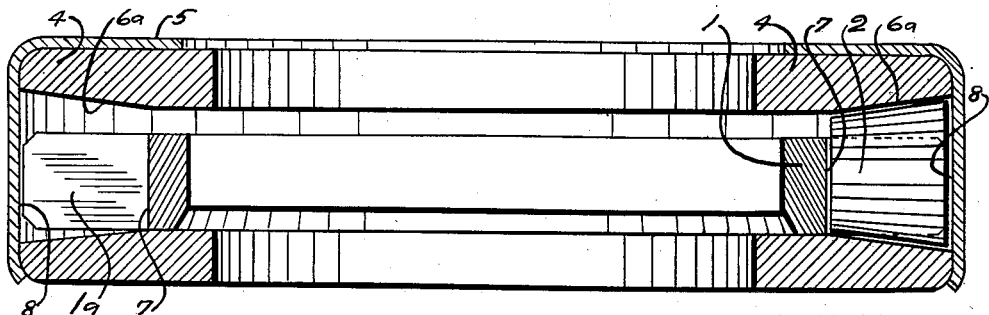
Fig. 4 is a cross section of a modification.

In the modified form shown in Fig. 4 the bearing faces 6a are tapered, instead of straight as shown in Fig. 3.

I claim:

A thrust bearing comprising a pair of races, rollers between the races, a separator spacing the rollers and having an inner ring, and a thin sheet metal jacket extending around and between the races, the rollers extending the full distance radially between the inner ring of the separator and the inside surface of the jacket, and the races having a straight bearing surface in line contact with the rollers, and the rollers extending to the outer edge of the races, whereby the rollers have a maximum radial bearing contact with the races in proportion to the total diameter of the bearing, said contact extending to the circumference of the bearing, less the thickness of the jacket.

WALTER E. HORROCKS.